United States Patent
Fecant et al.

(10) Patent No.: US 9,993,807 B2
(45) Date of Patent: Jun. 12, 2018

(54) METAL SULPHIDE-BASED COMPOSITE PHOTOCATALYST FOR PRODUCING HYDROGEN

(71) Applicants: IFP Energies nouvelles, Rueil-Malmaison (FR); CNRS, Paris (FR)

(72) Inventors: Antoine Fecant, Brignais (FR); Denis Uzio, Saint Genis Laval (FR); Dina Lofficial, Lyons (FR); Eric Puzenat, Lyons (FR); Elodie Blanco, Villeurbanne (FR); Pavel Afanasiev, Decines (FR); Gilles Berhault, Lyons (FR)

(73) Assignees: CNRS, Paris (FR); IFP Energies nouvelles, Rueil-Malmaison (FR)

( * ) Notice: Subject to any disclaimer, the term of this patent is extended or adjusted under 35 U.S.C. 154(b) by 533 days.

(21) Appl. No.: 14/411,827

(22) PCT Filed: Jun. 19, 2013

(86) PCT No.: PCT/FR2013/051431
§ 371 (c)(1),
(2) Date: Dec. 29, 2014

(87) PCT Pub. No.: WO2014/001691
PCT Pub. Date: Jan. 3, 2014

(65) Prior Publication Data
US 2015/0158017 A1   Jun. 11, 2015

(30) Foreign Application Priority Data
Jun. 29, 2012   (FR) ..................... 12 01853

(51) Int. Cl.
| | | |
|---|---|---|
| *B01J 23/06* | (2006.01) | |
| *B01J 23/28* | (2006.01) | |
| *B01J 23/60* | (2006.01) | |
| *B01J 23/883* | (2006.01) | |
| *B01J 23/885* | (2006.01) | |
| *B01J 27/04* | (2006.01) | |
| *C01G 39/06* | (2006.01) | |
| *C01B 3/04* | (2006.01) | |
| *C01G 9/08* | (2006.01) | |
| *B01J 37/03* | (2006.01) | |
| *B01J 27/053* | (2006.01) | |
| *B01J 35/00* | (2006.01) | |
| *B82Y 30/00* | (2011.01) | |
| *B01J 19/12* | (2006.01) | |
| *B01J 23/46* | (2006.01) | |

(Continued)

(52) U.S. Cl.
CPC ............. *B01J 27/04* (2013.01); *B01J 19/123* (2013.01); *B01J 23/462* (2013.01); *B01J 27/051* (2013.01); *B01J 27/053* (2013.01); *B01J 35/004* (2013.01); *B01J 35/006* (2013.01); *B01J 35/0013* (2013.01); *B01J 35/026* (2013.01); *B01J 37/0221* (2013.01); *B01J 37/031* (2013.01); *B01J 37/06* (2013.01); *B01J 37/20* (2013.01); *B01J 37/345* (2013.01); *B82Y 30/00* (2013.01); *C01B 3/04* (2013.01); *C01B 3/042* (2013.01); *C01G 9/08* (2013.01); *C01G 39/06* (2013.01); *C01P 2002/52* (2013.01); *C01P 2004/64* (2013.01); *C01P 2006/12* (2013.01); *Y02E 60/364* (2013.01)

(58) Field of Classification Search
CPC ... B01J 23/06; B01J 23/28; B01J 23/60; B01J 23/6525; B01J 23/686; B01J 23/883; B01J 23/885; B01J 23/8873; B01J 27/04; B01J 27/0515; B01J 35/004; C01G 9/08; C01G 39/06; C01P 2002/52; C01P 2004/64; C01P 2006/12; Y02E 60/364
USPC .......................................... 502/218, 220–223
See application file for complete search history.

(56) References Cited

U.S. PATENT DOCUMENTS

| | | | | |
|---|---|---|---|---|
| 4,721,558 A | * | 1/1988 | Jacobson ............... | C10G 49/04 208/108 |
| 4,822,590 A | * | 4/1989 | Morrison ............... | C01B 17/20 106/DIG. 2 |

(Continued)

FOREIGN PATENT DOCUMENTS

| | | | | |
|---|---|---|---|---|
| CN | 10 4324740 | * | 2/2015 | ............. B01J 27/19 |
| CN | 10 5016390 | * | 11/2015 | ............. B82Y 30/00 |

(Continued)

OTHER PUBLICATIONS

"Enhanced photocatalytic activity of ZnS nanoparticles loaded with MoS2 nanoflakes by self-assembly approach," S. V. Prabhakar Vattikuti et al. Physica B 502 (2016), pp. 103-112.*

(Continued)

*Primary Examiner* — Patricia L. Hailey
(74) *Attorney, Agent, or Firm* — Millen White Zelano and Branigan, PC; Csaba Henter

(57) ABSTRACT

The invention concerns a composition comprising a mixture of zinc sulphide (ZnS) and molybdenum sulphide ($MoS_x$), in which the Mo/Zn molar ratio is in the range 0.01 to 1.9. The invention also pertains to a process for its preparation as well as to its application in photocatalysis and more particularly to its application in photocatalysis for the production of dihydrogen from water ($H_2O$) and/or hydrogen sulphide ($H_2S$) and/or any other source of protons in the presence of a source emitting in the ultraviolet and/or visible spectrum.

20 Claims, No Drawings

(51) Int. Cl.
  *B01J 27/051* (2006.01)
  *B01J 35/02* (2006.01)
  *B01J 37/02* (2006.01)
  *B01J 37/06* (2006.01)
  *B01J 37/20* (2006.01)
  *B01J 37/34* (2006.01)

(56) References Cited

U.S. PATENT DOCUMENTS

| | | | |
|---|---|---|---|
| 2003/0206847 A1 | 11/2003 | Tohji et al. | |
| 2005/0059545 A1* | 3/2005 | Alonso | B01J 27/051 502/220 |
| 2008/0146438 A1* | 6/2008 | Bai | C10G 45/08 502/173 |
| 2012/0034154 A1 | 2/2012 | McHugh et al. | |
| 2013/0068613 A1* | 3/2013 | Hu | B01J 27/047 204/290.13 |
| 2013/0152788 A1* | 6/2013 | Turbeville | C10K 1/32 95/134 |
| 2013/0239469 A1* | 9/2013 | Chianelli | B01J 27/0515 44/451 |

FOREIGN PATENT DOCUMENTS

| | | | | |
|---|---|---|---|---|
| FR | 2997940 | * | 5/2014 | B01J 19/08 |
| WO | 2011/011064 | * | 1/2011 | B01J 23/89 |

OTHER PUBLICATIONS

International Search Report for PCT/FR2013/051431 dated Aug. 5, 2013.

Zhang, J. et al., "Visible light photocatalytic H2-Production Activity of CuS/ZnS Porous Nanosheets based on Photoinduced Interfacial Charge Transfer," Nano Letters, 2011, vol. 11, pp. 4774-4779.

Xiang, Q. et al., "Synergetic Effect of MoS2 and Graphene as Cocatalysts for Enhanced Photocatalytic H2 Production Activity of TiO2 Nanoparticles."

Zong, X. et al., "Enhancement of photocatalytic H2 Evolution on CdS by Loading MoS2 as Cocatalyst under Visible Light Irradiation," Journal of the American Chemical Society, 2008, vol. 130, pp. 7176-7177.

\* cited by examiner

METAL SULPHIDE-BASED COMPOSITE PHOTOCATALYST FOR PRODUCING HYDROGEN

The field of the invention is that of photocatalysts, and more specifically photocatalysts for the production of dihydrogen.

The present invention relates to a composition based on metallic sulphides, to a process for its preparation as well as to its use in photocatalysis, in particular for the production of hydrogen from a feed comprising water and/or hydrogen sulphide and/or any other source of protons. The aim of the invention is to propose a composition which can be used as a photocatalyst with an improved performance in terms of activity and stability applied to the process for the production of dihydrogen, as well as to a mode of preparation of this catalyst.

Part of the solar radiation hitting the surface of the earth can be converted into chemical energy by the production of dihydrogen ($H_2$) via photocatalytic dissociation of proton source compounds such as water ($H_2O$) or hydrogen sulphide ($H_2S$).

Dihydrogen is a clean, energy-dense molecule, and so production of this molecule by photocatalysis could be an answer to environmental problems which are increasing and to increasing global energy needs. In fact, dihydrogen may be used directly as a fuel for internal combustion engines for transport or for the generation of electrical energy in batteries. Water is the only end product obtained from these reactions; thus, no pollutants are produced.

PRIOR ART

Photocatalysts for the production of dihydrogen are known in the art.

Thus, the use of a photocatalyst based on $TiO_2$ on which metallic particles of platinum are deposited for the dissociation of pure liquid water under ultraviolet light (UV) is known (Catal. Lett., 34, p. 245 (1995)).

The use of nanoparticle type photocatalysts comprising a metallic core (Ag, Pd, Pt, Au) and a layer of semiconductor ($TiO_2$, ZnS, $Nb_2O_5$) for the production of dihydrogen by photolysis of water is known from document WO2011/011064.

The use of a photocatalyst based on InP on which nanoparticles of Pt are deposited for the production of dihydrogen from an aqueous solution of $Na_2S$ under UV radiation is known (Int. J. Hydrogen Energy, 25, p. 953 (2000)).

Many studies have proposed the use of a CdS semiconductor under visible light for the production of dihydrogen from an aqueous solution of $Na_2S+Na_2SO_4$, used either with metallic particles of Pt (J. Phys. Chem., 87, p. 3807 (1983)), ZnS (J. Photochem. Photobiol. A, 157, p. 87(2003)), $TiO_2$ or nanoparticles of Pt (J. Mater. Chem., 18, p. 2379 (2008)). A photocatalyst also functioning in the visible region and based on CdS—$MoS_2$ has also been studied for the production of $H_2$ directly from lactic acid (J. Am. Chem. Soc. 130, p. 7176 (2008)).

Other photocatalysts of the metallic sulphide type ($Na_{14}In_{17}Cu_3S_{35}.xH_2O$, Angew. Chem, 117, p. 5433 (2005)) or oxysulphide type ($Sm_2Ti_2S_2O_5$, J. Am. Chem. Soc., 124, p. 13547 (2002)) have been reported in the literature for the production of dihydrogen under visible light by photocatalytic dissociation of an aqueous solution of $Na_2S$ or methanol.

It is also known to produce dihydrogen in visible light from an alkaline solution through which a stream of $H_2S$ is passed in the presence of photocatalysts of the type $CdIn_2S_4$ (Adv. Funct. Mater., 16, p. 1349 (2006)), $CuGa_{1-x}In_xO_2$ (Catalysis Communications, 9, p. 395 (2008)) and $FeGaO_3$ (Int. J. Hydrogen Energy, 33, p. 6586 (2008)).

Finally, the use of a photocatalyst based on doped ZnS (with Cu, for example) in the presence of particles of noble metal is known from the work by Can Li et al (Chinese Journal of Catalysis, 29(4), p. 313 (2008)) for the production of dihydrogen by photocatalytic dissociation of a stream of $H_2S$ in the gas phase under UV-visible radiation.

However, the photocatalysts proposed in the prior art for this type of process have low yields, and in particular generally suffer from substantial deactivation throughout the photocatalytic cycle. Similarly, certain photocatalysts proposed in the prior art are only activated in UV radiation and not in visible light.

Thus, the aim of the invention is to propose a novel composition for use as a photocatalyst with an improved performance in terms of activity and stability applied to a process for the production of dihydrogen from a feed comprising water and/or hydrogen sulphide and/or any other source of protons in the presence of radiation emitting in the UV spectrum and/or the visible spectrum.

Surprisingly, the Applicant has discovered that compositions comprising a mixture of zinc sulphide (ZnS) and molybdenum sulphide ($MoS_x$) and complying with a certain Mo/Zn molar ratio are active and particularly stable in a dihydrogen production process.

Thus, the present invention describes a novel type of photocatalyst which, because of its components and the fact that it complies with a certain ratio between them, can be used to obtain a stable photocatalyst, i.e. the loss of activity in the dihydrogen production over time is less than that of known prior art catalysts for this same reaction. In addition, the photocatalysts of the invention are not only activated by UV radiation, but also by visible radiation. This means that terrestrial solar energy, in particular the natural light emitted by the sun, can be used more efficiently.

The present invention also concerns a process for the preparation of this photocatalytic composition, as well as its use in a process for the production of dihydrogen from a feed comprising water and/or hydrogen sulphide and/or any other source of protons in the presence of radiation emitting in the UV spectrum and/or in the visible spectrum.

The groups for the chemical elements given below are in accordance with the CAS classification (CRC Handbook of Chemistry and Physics, published by CRC press, editor in chief D. R. Lide, 81$^{st}$ edition, 2000-2001). As an example, group VIII in accordance with the CAS classification corresponds to metals from columns 8, 9 and 10 of the new IUPAC classification.

DETAILED DESCRIPTION OF THE INVENTION

The invention concerns a composition based on a sulphide of a transition metal, a process for its preparation, and its use in photocatalysis and in particular in a process for the production of dihydrogen.

Catalyst in Accordance with the Invention

More particularly, the invention concerns a composition comprising a mixture of zinc sulphide (ZnS) and molybdenum sulphide ($MoS_x$) and in which the Mo/Zn molar ratio is in the range 0.01 to 1.9, preferably in the range 0.5 to 1.5. The ratio is calculated on the basis of the elements Mo and Zn.

The composition comprising the mixture of zinc sulphide (ZnS) and molybdenum sulphide ($MoS_x$) is preferably in the form of nanoparticles. The size of the zinc sulphide and molybdenum sulphide nanoparticles is generally less than 1 µm (1000 nm), preferably in the range 10 to 500 nm, more preferably in the range 10 to 200 nm.

In general, small particle sizes are desired in order to increase the surface/volume ratio in order to obtain a large surface area available for the photogenerated reactive species. The surface area of the composition of the invention is generally in the range 10 to 100 $m^2/g$, preferably in the range 20 to 80 $m^2/g$.

The formula "$MoS_x$" means molybdenum sulphide in which x is in the range 2 to 3. Thus, the molybdenum sulphide may be in its $MoS_2$ or $MoS_3$ form, or a mixture of the two. Preferably, it is in the $MoS_2$ form.

The quantity of the mixture of zinc sulphide (ZnS) and molybdenum sulphide ($MoS_x$) in the composition is generally more than 20% by weight, preferably more than 50% by weight, and more preferably more than 90% by weight. The composition of the invention may comprise a porous support, generally in the form of oxides, such as alumina ($Al_2O_3$), silica ($SiO_2$), titanium oxide ($TiO_2$), cerine ($CeO_2$) or zirconia ($ZrO_2$), for example. Highly preferably, the composition contains only a mixture of zinc sulphide and molybdenum sulphide, optionally supplemented with at least one metal from group VIII and/or group IB in its metallic or sulphide form. Thus, when used as a catalyst, it can be in its bulk form.

The composition may be in the form of beads, extrudates, pellets or as a powder; it is preferably in the powder form.

In a variation, the composition of the invention may further comprise at least one metal from group VIII and/or group IB in its metallic or sulphide form. In the case in which two metals are present, they may be in the form of an alloy. Preferably, the metal from group VIII and/or group IB is selected from platinum, palladium, gold, nickel, cobalt, ruthenium and rhodium.

The quantity of metal from group VIII and/or group IB in its metallic or sulphide form on the composition of the invention is generally in the range 0.01% to 5% by weight of metal on the composition, preferably in the range 0.1% to 2% by weight of metal.

The fact that the composition of the invention further comprises at least one metal from group VIII and/or group IB in its metallic or sulphide form (as a co-catalyst) means that the activity of the photocatalysts can be increased by enhanced charge separation and improved reagent adsorption.

Preparation of the Composition

The composition of the invention may be prepared in accordance with any mode of preparation known to the skilled person.

In a first variation, the composition of the invention may be prepared by mechanically mixing ZnO and $MoO_3$ in a ratio that can produce a Mo/Zn ratio in the range 0.01 to 1.9, preferably in the range 0.5 to 1.5. The ZnO and $MoO_3$ are preferably in the form of nanoparticles. The two powders are mixed by stirring, preferably at ambient temperature, in a reactor using an agitator shaft system, generally for 6 h to 48 h, preferably for 12 to 24 h, and at a rotation rate which is generally 10 to 500 revolutions per minute, preferably 25 to 100 revolutions per minute.

In order to obtain the metallic sulphide phases, it is necessary for the mixture of oxides to then undergo a high temperature sulpho-reducing treatment. This sulphurization treatment is carried out using methods which are well known in the art, and advantageously in a sulpho-reducing atmosphere in the presence of hydrogen and hydrogen sulphide, in order to transform the metallic oxides into sulphides such as $MoS_x$ and ZnS, for example. Sulphurization is carried out by injecting a stream containing $H_2S$ and dihydrogen onto the mixture of oxides, or a sulphur-containing compound which is capable of decomposing into $H_2S$ in the presence of a catalyst and hydrogen. Polysulphides such as dimethyldisulphide are precursors of $H_2S$ which are routinely used to sulphurize catalysts. As an example, a stream containing 15% by volume of $H_2S$ and 85% by volume of dihydrogen is used. The temperature is adjusted so that the $H_2S$ reacts with the metallic oxides to form metallic sulphides. This sulphurization may be carried out at temperatures in the range 500° C. to 900° C., and more preferably in the range 600° C. to 800° C. The sulphurization period is generally in the range 0.5 hours to 5 hours, preferably in the range 0.5 to 2 hours.

In a second variation, the composition of the invention may be prepared by mechanically mixing ZnS and $MoS_2$ in a ratio which can obtain a Mo/Zn ratio in the range 0.01 to 1.9, preferably in the range 0.5 to 1.5. The ZnS and the $MoS_2$ are preferably in the form of nanoparticles. The two powders are mixed by stirring, preferably at ambient temperature, in a reactor using an agitator shaft system, generally for 6 h to 48 h, preferably for 12 to 24 h, and at a rotational rate which is generally 10 to 500 revolutions per minute, preferably 25 to 100 revolutions per minute.

In accordance with a third variation, which is particularly preferred, the composition of the invention may be prepared by glycothermal synthesis. More particularly, the process for the preparation of the composition in accordance with this variation comprises the following steps:

a) precipitating a molybdenum precursor in the presence of a sulphur-containing compound and zinc sulphide in a solvent comprising a polyol at a temperature in the range 150° C. to 250° C., in order to obtain a solution containing a composition comprising a mixture of a precipitate of zinc sulphide and a precipitate of molybdenum sulphide;

b) separating the composition obtained in step a) from the solution, then optionally washing said composition, and drying said composition;

c) sulphurizing the composition obtained in step b) in the presence of a stream containing $H_2S$ and hydrogen.

The zinc sulphide may already have been synthesised. More particularly, step a) may comprise the following sub-steps:

a') mixing an aqueous solution containing at least one ionic zinc precursor with an aqueous solution containing a sulphur-containing compound in order to obtain a precipitate of zinc sulphide;

a") separating the zinc sulphide precipitate obtained in step a') from the aqueous solution, optionally washing it, and dispersing it in a solvent comprising a polyol in order to obtain a solution comprising said polyol in which the zinc sulphide precipitate is dispersed;

a''') mixing a solution containing a polyol and at least one ionic molybdenum precursor with a solution containing a polyol and a sulphur-containing compound at a temperature in the range 150° C. to 250° C.;

a'''') adding the solution obtained in step a''') to the solution obtained in step a"), which has been preheated to a temperature in the range 150° C. to 250° C., in order to obtain a composition comprising a mixture of a precipitate of zinc sulphide and a precipitate of molybdenum sulphide.

Thus, in step a'), an aqueous solution containing at least one ionic zinc precursor is mixed with an aqueous solution containing a sulphur-containing compound in order to obtain a precipitate of zinc sulphide. The ionic zinc precursor may be zinc nitrate or chloride. The sulphur-containing compound may be sodium sulphide.

In step a"), the precipitate of ZnS sulphide formed thereby is separated from the aqueous solution, preferably by centrifuging. It is then preferably washed, preferably with an alcohol such as ethanol, before being dispersed in a solvent comprising a polyol. The polyol is preferably an alkyldiol containing 2 to 8 carbon atoms such as 1,4-butanediol, 1,3-propanediol or ethylene glycol. Preferably, the polyol is ethylene glycol.

In step a'''), a solution containing a polyol and at least one ionic molybdenum precursor is mixed with a solution containing a polyol and a sulphur-containing compound at a temperature in the range 150° C. to 250° C. The polyol is preferably an alkyldiol containing 2 to 8 carbon atoms such as 1,4-butanediol, 1,3-propanediol or ethylene glycol. Preferably, the polyol is ethylene glycol.

The ionic molybdenum precursor may, for example, be selected from ammonium heptamolybdate, ammonium tetramolybdate and ammonium tetrathiomolybdate. It is preferably ammonium heptamolybdate.

The sulphur-containing compound may be elemental sulphur, ammonium sulphide, thiourea or any other source of sulphide. It is preferably elemental sulphur. Mixing is carried out at a temperature in the range 150° C. to 250° C., preferably in the range 180° C. to 220° C.

In step a''''), the solution obtained (containing molybdenum) is added to the solution containing the zinc sulphide, which has been preheated beforehand to a temperature in the range 150° C. to 250° C., preferably in the range 180° C. to 220° C., in order to obtain a composition comprising a mixture of a precipitate of zinc sulphide and a precipitate of molybdenum sulphide. Preferably, the temperature of the solution containing the molybdenum is identical to the solution containing the zinc sulphide. The polyol used in the two solutions may be identical or different, preferably identical.

In order to obtain a composition comprising a mixture of a precipitate of zinc sulphide and a precipitate of molybdenum sulphide, the reaction is preferably carried out under reflux, preferably for several hours and in an inert atmosphere (for example in nitrogen).

In step b), the composition comprising the mixture of precipitates is then separated from the solution, preferably by centrifuging, then optionally washed, for example with alcohol such as ethanol, and finally dried, preferably in a stream of an inert gas (for example in nitrogen) and preferably at ambient temperature.

In order to obtain a composition with good crystallinity, it is then necessary for it to undergo a sulpho-reducing treatment (step c)) in the presence of a stream containing $H_2S$ and dihydrogen. Sulphurization is carried out at a temperature in the range 500° C. to 900° C., more preferably in the range 600° C. to 800° C. The sulphurization period is generally in the range 0.5 hours to 5 hours, preferably in the range 0.5 to 2 hours. As an example, a stream containing 15% by volume of $H_2S$ and 85% by volume of dihydrogen is used.

The composition of the invention may also comprise at least one metal from group VIII and/or group IB in its metallic or sulphide form. Thus, the process for the preparation of the composition of the invention may, after step c), comprise a supplemental step in which at least one metal from group VIII and/or group IB is deposited on the composition. Deposition of the metal from group VIII and/or group IB may be carried out using any method which is known to the skilled person such as dry impregnation, excess impregnation, grafting or deposition by photoreduction. The metal from group VIII and/or group IB is generally deposited at the surface of the composition.

In accordance with a preferred first variation, this deposition of at least one metal from group VIII and/or group IB is carried out by photoreduction deposition. This method is advantageous because the equipment used for the photocatalytic reactions may be identical to the photoreduction equipment.

Thus, after step c), a step is carried out for depositing at least one metal from group VIII and/or group IB onto the composition by photoreduction so as to obtain said metal in its metallic form, said deposition step being carried out by bringing the composition obtained in step c) into contact with an aqueous solution containing a sacrificial electron donor agent and a precursor of the metal from group VIII or group IB under ultraviolet radiation, then separating said composition from the aqueous solution, optionally washing said composition, and drying said composition.

The metal deposited on the composition is selected from those from groups VIII and IB of the periodic classification of the elements. Preferably, the metal is platinum, palladium, gold, nickel, cobalt, ruthenium or rhodium. The metal precursor salt is generally selected from the group constituted by chlorides, nitrates and sulphates. Preferably, the metal precursor salt is a chloride or a nitrate.

The composition is stirred in a glass reactor in the form of a suspension in an aqueous solution containing a sacrificial electron donor agent and a precursor salt of a metal from group VIII and/or group IB. The sacrificial agent may be any organic or mineral species which is an electron donor which is soluble in water. Preferably, the sacrificial agent is an alcohol. Highly preferably, the sacrificial agent is methanol. The volumetric ratio between the sacrificial agent and the water is in the range 0.001 to 0.9, preferably in the range 0.02 to 0.1. The concentration of the precursor salt in solution is calculated in order to deposit between 0.01% and 5% by weight of metal on the composition, preferably in the range 0.1% to 2% by weight of metal. The suspension is stirred continuously and under ultraviolet radiation, generally for 0.5 hours to 6 hours, preferably for 1 to 3 hours. After the reaction, the solid obtained is separated, for example by filtration or centrifuging, optionally washed, and finally dried in order to eliminate a portion or all of the water introduced during the impregnation, generally at a temperature in the range 50° C. to 250° C., preferably in the range 70° C. to 200° C. Drying may be carried out in air, or in an inert atmosphere (for example nitrogen), generally for 6 hours to 48 hours, preferably 12 hours to 24 hours.

Optionally, if a composition comprising at least one metal from group VIII and/or group IB in its sulphide form is to be obtained, after the step for depositing said metal, the composition undergoes sulphurization in the presence of a stream containing $H_2S$ and hydrogen in order to obtain said metal in its sulphide form. Sulphurization is carried out at a temperature in the range 500° C. to 900° C., more preferably in the range 600° C. to 800° C. The sulphurization period is generally in the range 0.5 hours to 5 hours, preferably in the range 0.5 to 2 hours. As an example, a stream containing 15% by volume of $H_2S$ and 85% by volume of dihydrogen is used.

In accordance with a preferred variation, deposition of at least one metal from group VIII and/or group IB is carried out by dry impregnation. Dry impregnation consists of bringing the composition into contact with the aqueous solution containing the precursor salt of the metal from group VIII and/or group IB with a volume equal to the pore volume of the composition to be impregnated.

Thus, after step c), a step is carried out for depositing at least one metal from group VIII and/or group IB onto the composition by dry impregnation, said deposition step being carried out by bringing the composition obtained in step c) into contact with an aqueous solution of a precursor salt of a metal from group VIII and/or group IB, then drying said composition and calcining said composition, then either reducing said composition in the presence of a reducing gas in order to obtain said metal in its metallic form, or said composition undergoes sulphurization in the presence of a stream containing $H_2S$ and hydrogen so as to obtain said metal in its sulphide form.

The metal deposited on the composition is selected from those from groups VIII and IB of the periodic classification of the elements. Preferably, the metal is platinum, palladium, gold, nickel, cobalt, ruthenium or rhodium. The metal precursor salt is generally selected from the group constituted by chlorides, nitrates and sulphates. Preferably, the precursor metal salt is a chloride or a nitrate. A volume of precursor salt in aqueous solution corresponding to the pore volume of the prepared solid is impregnated dropwise at ambient temperature. The total pore volume is measured by mercury porosimetry in accordance with the standard ASTM D4284-92 with a wetting angle of 140°, for example using an Autopore III model instrument from Micromeritics™. The concentration of precursor salt of the metal from group VIII and/or group IB in the aqueous solution is calculated such that the final concentration of metal is in the range 0.01% to 5% by weight on the composition, preferably in the range 0.1% to 2% by weight of metal.

The impregnated composition is then dried in order to eliminate all or a portion of the water introduced during impregnation, preferably at a temperature in the range 50° C. to 250° C., more preferably in the range 70° C. to 200° C. Drying may be carried out in air, or in an inert atmosphere (for example nitrogen).

The composition is then calcined in a stream of gas, preferably in air, in hydrogen, in nitrogen or in a mixture of at least two of these gases, at an hourly space velocity (HSV) in the range 100 to 5000 $h^{-1}$, the hourly space velocity (HSV) being defined as the volume of feed/volume of catalyst/hour. The calcining temperature is generally in the range 150° C. to 900° C., preferably in the range 200° C. to 500° C. The calcining period is generally in the range 0.5 hours to 24 hours, preferably 1 hour to 12 hours. The calcining step may be operated using temperature stages, up to the defined maximum set temperature.

The composition is then generally reduced in a stream of gas comprising in the range 25% by volume to 100% by volume of a reducing gas, preferably 100% by volume of a reducing gas. The reducing gas is preferably dihydrogen. Preferably, this step is carried out at a temperature in the range 50° C. to 500° C., more preferably in the range 80° C. to 450° C.

Optionally, if it is desired to obtain a composition comprising at least one metal from group VIII and/or group IB in its sulphide form, after the step for depositing said metal and instead of reduction in a reducing gas, the composition is sulphurized in the presence of a stream containing $H_2S$ and hydrogen so as to obtain said metal in its sulphide form. Sulphurization is carried out at a temperature in the range 500° C. to 900° C., more preferably in the range 600° C. to 800° C. The sulphurization period is generally in the range 0.5 hours to 5 hours, preferably in the range 0.5 hours to 2 hours. As an example, a stream containing 15% by volume of $H_2S$ and 85% by volume of dihydrogen is used.

Use in Photocatalysis: Hydrogen Production Process

The invention also pertains to the use of the composition of the invention as a photocatalyst, and in particular as a photocatalyst for the production of dihydrogen from water ($H_2O$) and/or hydrogen sulphide ($H_2S$) and/or any other source of protons.

More particularly, the invention pertains to a process for the production of hydrogen, in which a feed comprising water and/or hydrogen sulphide and/or any other source of protons is brought into contact with a composition in accordance with the invention in the presence of radiation emitting in at least one range of wavelengths above 280 nm, in order to produce an effluent containing dihydrogen.

The dihydrogen production process may be carried out in a liquid or gaseous medium. Thus, the feed comprising water and/or hydrogen sulphide and/or any other source of protons is in the liquid and/or gaseous form. Pure reagents are not necessary. As an example, the liquid medium may contain solvated ions ($Na^+$, $K^+$, $S^{2-}$, $CO_3^{2-}$, $Cl^-$, $Br^-$, $NO_3^-$, etc.) or in the gaseous medium, carbonaceous species or species containing no hydrogen may be present (CO, $CO_2$, COS, $CH_4$, $N_2$ etc.).

The water feed may be distilled water or water containing ions or pollutants (seawater, river water, rain water, industrial, agricultural or domestic waste water, etc.).

The hydrogen sulphide feed may be a gaseous or liquid industrial or natural effluent, or indeed a solution containing $Na_2S$.

Examples of other proton sources are alcohols, in particular aliphatic or aromatic alcohols such as methanol, ethanol or phenol, or carboxylic acids such as acetic acid, citric acid etc.

The dihydrogen production process may be carried out in any type of reactor suitable for a photocatalytic reaction. Thus, it can be carried out in reactors which are entirely of glass or have optical non-absorbing windows in order to allow radiation to reach the surface of the photocatalyst. The type of reactor technology in which a photocatalyst can be used is generally suitable for a suspension. This type of technology is also known as a "slurry" reactor. The reactor technology may also be of the solar panel type having a trickle bed or flushed bed on a porous or non-porous support.

The radiation emits in at least one range of wavelengths above 280 nm, preferably 315 nm to 800 nm, which includes the UV spectrum and/or the visible spectrum. The radiation may be entirely UV-visible radiation such as natural sunlight, a Hg type lamp, a Xe type lamp, or a LED type lamp. Preferably, the radiation is natural sunlight.

The light output is in the range 1 to 50 $mW/cm^2$, preferably in the range 1 to 35 $mW/cm^2$.

The process for the production of hydrogen has the advantage of being capable of being carried out under very mild operating conditions, in particular at ambient temperature and/or at atmospheric pressure. It may also be carried out at higher temperatures and pressures.

In the case of deposition by water photoreduction, for example, it is possible to produce dihydrogen ($H_2$) at ambient temperature and at atmospheric pressure by placing the photocatalyst of the invention in suspension in a quartz reactor filled with water. The whole of the suspension is irradiated by a UV-visible light source.

In the case of processing refinery gas containing hydrogen sulphide from desulphurization units, the average composition of the gas to be treated is as follows before amine washing: 1% by weight $H_2$, 15% by weight $C_1$, 18% by weight $C_2$, 14% by weight $C_3$, 13% by weight $C_4$, 5% by weight $C_5^+$, 34% by weight $H_2S$. When the gas to be processed has undergone amine washing, the average composition is as follows: 2.5% by weight $H_2O$ and 97.5% by weight $H_2S$. By carrying out the process of the invention, it is thus possible to convert the $H_2S$ and optionally the $H_2O$ contained in these refinery gases into dihydrogen at the gas inlet temperature, i.e. 20° C. to 100° C., and at ambient pressure.

The invention will now be illustrated by the following examples which are not in any way limiting in nature.

EXAMPLES

Example 1

Photocatalyst A (not in Accordance with the Invention): $TiO_2$

Commercial titanium dioxide ($TiO_2$ AEROXIDE® $TiO_2$ P 25™) with a specific surface area of 50 $m^2/g$ and a mean particle size of 21 nm was used as is as the photocatalyst A.

Example 2

Photocatalyst B (not in Accordance with the Invention): $TiO_2$+Pt 0.0712 g of $H_2PtCl_6.6H_2O$ (37.5% by weight of metal) was placed in 500 mL of distilled water. 50 mL of this solution was removed and placed in a jacketed glass reactor. 3 mL of methanol then 250 mg of catalyst A were then added, with stirring, to form a suspension.

Stirring of the mixture was then continued under UV radiation for two hours. The lamp used to provide the UV radiation was a 125 W HPK™ mercury vapour lamp.

The mixture was then centrifuged for 10 minutes at 3000 revolutions per minute in order to recover the solid. Two washes were then carried out with water, each of the washes being followed by centrifuging. Finally, the recovered powder was placed in an oven at 110° C. for 24 hours. Photocatalyst B was thus obtained.

The quantity of the metal Pt was found to be 0.93% by weight using inductively coupled plasma atomic emission spectroscopy, ICP-AES.

Example 3

Photocatalyst C (not in Accordance with the Invention): $TiO_2$+Ru 0.0529 g of $RuCl_3.xH_2O$ was placed in 500 mL of distilled water. 50 mL of this solution was removed and placed in a jacketed glass reactor. 3 mL of methanol then 250 mg of catalyst A were then added, with stirring, to form a suspension.

Stirring of the mixture was then continued under UV radiation for two hours. The lamp used to provide the UV radiation was a 125 W HPK™ mercury vapour lamp.

The mixture was then centrifuged for 10 minutes at 3000 revolutions per minute in order to recover the solid. Two washes were then carried out with water, each of the washes being followed by centrifuging. Finally, the recovered powder was placed in an oven at 110° C. for 24 hours. Photocatalyst C was thus obtained.

The quantity of the metal Ru was found to be 0.25% by weight using ICP-AES.

Example 4

Photocatalyst D (not in Accordance with the Invention): ZnS

Commercial zinc sulphide (ZnS, 99.99%) with a mean particle size of 10 μm was used as is to act as the photocatalyst D.

Example 5

Photocatalyst E (not in Accordance with the Invention): ZnS+Ru 0.0529 g of $RuCl_3.xH_2O$ was placed in 500 mL of distilled water. 50 mL of this solution was removed and placed in a jacketed glass reactor. 3 mL of methanol then 250 mg of catalyst D were then added, with stirring, to form a suspension.

Stirring of the mixture was then continued under UV radiation for two hours. The lamp used to provide the UV radiation was a 125 W HPK™ mercury vapour lamp.

The mixture was then centrifuged for 10 minutes at 3000 revolutions per minute in order to recover the solid. Two washes were then carried out with water, each of the washes being followed by centrifuging. Finally, the recovered powder was placed in an oven at 110° C. for 24 hours. Photocatalyst E was thus obtained.

The quantity of the metal Ru was found to be 0.20% by weight using ICP-AES.

Example 6

Photocatalyst F (not in Accordance with the Invention): ZnS+$MoS_2$, Mo/Zn ratio=2

In a first step, 50 mL of an aqueous sodium sulphide solution (0.1 M) was mixed with 100 mL of an aqueous zinc nitrate solution (0.1 M). The zinc sulphide precipitate formed was separated by centrifuging for 5 min at 3000 rpm then washed twice with ethanol before being dispersed in ethylene glycol. The concentration of ZnS in the final solution was 0.1 M. In a second step, three solutions were prepared:
  20 mL of a solution A containing 2 M elemental sulphur dissolved in 20 mL of ethylene glycol (EG) at 200° C., with stirring and in a stream of nitrogen, 10 mL of a 0.56 M solution B containing ammonium heptamolybdate, $(NH_4)_6Mo_7O_{24}.4H_2O$ dissolved in EG at 200° C.;
  20 mL of solution C from the first step containing ZnS nanoparticles, also heated to 200° C.

The three solutions were mixed and homogenized at 200° C. in the following sequence: solution A was added to solution B and solution C was then added to this mixture. The reaction was then carried out at 200° C. under reflux for 3 h in a flow of nitrogen until a brown-black precipitate appeared. This precipitate was separated by centrifuging, washed with ethanol and finally dried in a stream of nitrogen at ambient temperature. It then underwent a sulphoreduction treatment at a temperature of 750° C. for 1 h in a $H_2/H_2S$ stream at 15/85% vol/vol.

Photocatalyst F was then obtained, with a Mo/Zn molar ratio of 2.

Example 7

Photocatalyst G (in Accordance with the Invention): ZnS+MoS$_2$, Mo/Zn ratio=1

In a first step, 50 mL of an aqueous sodium sulphide solution (0.1 M) was mixed with 100 mL of an aqueous zinc nitrate solution (0.1 M). The zinc sulphide precipitate formed was separated by centrifuging for 5 min at 3000 revolutions per minute then washed twice with ethanol before being dispersed in ethylene glycol. The concentration of ZnS in the final solution was 0.1 M. In a second step, three solutions were prepared:

20 mL of a solution A containing 2 M elemental sulphur dissolved in 20 mL of ethylene glycol (EG) at 200° C., with stirring and in a stream of nitrogen, 10 mL of a 0.56 M solution B containing ammonium heptamolybdate, $(NH_4)_6Mo_7O_{24}\cdot 4H_2O$ dissolved in EG at 200° C.;

40 mL of solution C from the first step containing ZnS nanoparticles, also heated to 200° C.

The three solutions were mixed and homogenized at 200° C. in the following sequence: solution A was added to solution B and solution C was then added to this mixture. The reaction was then carried out at 200° C. under reflux for 3 h in a flow of nitrogen until a brown-black precipitate appeared. This precipitate was separated by centrifuging, washed with ethanol and finally dried in a stream of nitrogen at ambient temperature. In order to obtain good crystallinity in the material, it was necessary for it to then undergo a sulphoreduction treatment at a temperature of 750° C. for 1 h in a $H_2/H_2S$ stream at 15/85% vol/vol.

Photocatalyst G was then obtained, with a Mo/Zn molar ratio of 1.

Example 8

Photocatalyst H (in Accordance with the Invention): ZnS+MoS$_2$, Mo/Zn ratio=1+Ru 0.0529 g of $RuCl_3\cdot xH_2O$ was placed in 500 mL of distilled water. 50 mL of this solution was removed and placed in a jacketed glass reactor. 3 mL of methanol then 250 mg of photocatalyst G were then added, with stirring, to form a suspension.

Stirring of the mixture was then continued under UV radiation for two hours. The lamp used to provide the UV radiation was a 125 W HPK™ mercury vapour lamp. The mixture was then centrifuged for 10 minutes at 3000 revolutions per minute in order to recover the solid. Two washes were then carried out with water, each of the washes being followed by centrifuging. Finally, the recovered powder was placed in an oven at 110° C. for 24 hours. Photocatalyst H was thus obtained.

The quantity of the metal Ru was found to be 0.20% by weight using ICP-AES.

Example 9

Evaluation of Photocatalysts in the Production of Dihydrogen with Na$_2$S Solution The photocatalysts A, B, C, D, E, F, G and H underwent a photocatalytic dihydrogen production test in a semi-open stirred Pyrex reactor which had been double-jacketed to regulate the test temperature. To this end, 1 to 5 g/L of photocatalyst was suspended in 50 mL of an aqueous Na$_2$S solution with a pH of 13.

The tests were carried out at 25° C. at atmospheric pressure with an argon flow rate of 5 mL/min in order to entrain the dihydrogen gas produced which was analysed by gas phase chromatography. The source of the UV-visible radiation was a Xe—Hg lamp with an output of 300 W (Asahi™, MAX302™). The test period was 20 hours.

The photocatalytic activities are expressed in μmol of dihydrogen produced per hour and per gram of photocatalyst. The stability of the photocatalysts is expressed as the loss of activity as a percentage, calculated using the following formula: ((initial activity−activity at 20 h)/initial activity)×100. The results are shown in the table. The values for the activity and loss of activity show that the catalysts of the invention are those which systematically exhibited the best performances.

TABLE

Dihydrogen production results

| Photocatalyst | | Mass inserted (g) | Initial activity (μmol/h/g) | Activity at 20 h of test (μmol/h/g) | Loss of activity (%) |
|---|---|---|---|---|---|
| A (not in accordance) | TiO$_2$ | 0.05 | 0 | 0 | — |
| B (not in accordance) | TiO$_2$ + Pt | 0.10 | 87.5 | 25 | 71 |
| C (not in accordance) | TiO$_2$ + Ru | 0.05 | 0 | 0 | — |
| D (not in accordance) | ZnS | 0.25 | 16.5 | 3.6 | 78 |
| E (not in accordance) | ZnS + Ru | 0.05 | 95 | 42.5 | 55 |
| F (not in accordance) | ZnS + MoS$_2$, ratio Mo/Zn = 2 | 0.22 | 0 | 0 | — |
| G (in accordance) | ZnS + MoS$_2$, ratio Mo/Zn = 1 | 0.04 | 45.7 | 36.6 | 20 |
| H (in accordance) | ZnS + MoS$_2$, ratio Mo/Zn = 1 + Ru | 0.05 | 108 | 93 | 14 |

The invention claimed is:

1. A composition comprising a mixture of zinc sulphide and molybdenum sulphide, in which the Mo/Zn molar ratio is in the range of 0.01 to 1.9, and in which the mixture of zinc sulphide and molybdenum sulphide is in the form of nanoparticles less than 1 μm in size.

2. The composition according to claim 1, in which the Mo/Zn molar ratio is in the range of 0.5 to 1.5.

3. The composition according to claim 1, in which the mixture of zinc sulphide and molybdenum sulphide is in the form of nanoparticles in the range of 10 to 500 nm in size.

4. The composition according to claim 1, further comprising at least one metal from group VIII and/or group IB in its metallic or sulphide form.

5. The composition according to claim 4, in which the metal from group VIII and/or group IB is platinum, palladium, gold, nickel, cobalt, ruthenium or rhodium.

6. The composition according to claim 4, in which the quantity of metal from group VIII and/or group IB is in the range of 0.01% to 5% by weight of metal on the composition.

7. A process for the preparation of the composition comprising a mixture of zinc sulphide and molybdenum sulphide, in which the Mo/Zn molar ratio is in the range of 0.01 to 1.9, the process comprising the following steps:
   a) precipitating a molybdenum precursor in the presence of a sulphur-containing compound and zinc sulphide in a solvent comprising a polyol at a temperature in the range of 150° C. to 250° C., to obtain a solution containing a composition comprising a mixture of a precipitate of zinc sulphide and a precipitate of molybdenum sulphide;
b) separating the composition obtained in step a) from the solution, then optionally washing said composition, and drying said composition; and
c) sulphurizing the composition obtained in step b) in the presence of a stream containing $H_2S$ and hydrogen.

8. The process for preparing the composition according to claim 7, in which the polyol is an alkyldiol containing 2 to 8 carbon atoms.

9. The process for preparing the composition according to claim 7 in which, after step c), a step is carried out for depositing at least one metal from group VIII and/or group IB onto the composition by photoreduction to obtain said metal in its metallic form, said deposition step being carried out by bringing the composition obtained in step c) into contact with an aqueous solution containing a sacrificial electron donor agent and a precursor of the metal from group VIII and/or group IB under ultraviolet radiation, then separating said composition from the aqueous solution, optionally washing said composition, and drying said composition.

10. The process for preparing the composition according to claim 9, in which the composition comprising at least one metal from group VIII and/or group IB in its metallic form undergoes sulphurization in the presence of a stream containing $H_2S$ and hydrogen to obtain said metal in its sulphide form.

11. A process for preparing the composition according to claim 7 in which, after step c), a step is carried out for depositing at least one metal from group VIII and/or group IB onto the composition by dry impregnation, said deposition step being carried out by bringing the composition obtained in step c) into contact with an aqueous solution of a precursor salt of a metal from group VIII and/or group IB, then drying said composition and calcining said composition, then either reducing said composition in the presence of a reducing gas to obtain said metal in its metallic form, or said composition undergoes sulphurization in the presence of a stream containing $H_2S$ and hydrogen to obtain said metal in its sulphide form.

12. A process for photocatalyzing a reaction, comprising achieving said photocatalization by contacting the reactants with the composition according to claim 1.

13. A process for the production of hydrogen, in which a feed comprising water and/or hydrogen sulphide and/or a source of protons is brought into contact with a composition according to claim 1 in the presence of radiation emitting in at least one wavelength range above 280 nm, to produce an effluent containing hydrogen.

14. The process for the production of hydrogen according to claim 13, in which the feed comprising water and/or hydrogen sulphide and/or a source of protons is in the liquid and/or gaseous form.

15. The process for the production of hydrogen according to claim 13, in which the output of the radiation is in the range 1 to 50 $mW/cm^2$.

16. The composition according to claim 1, in which the mixture of zinc sulphide and molybdenum sulphide is in the form of nanoparticles in the range of 10 to 200 nm in size.

17. The composition according to claim 1, in which the mixture of zinc sulphide and molybdenum sulphide is in the form of nanoparticles in the range of 200 to 500 nm in size.

18. The composition according to claim 1, in which the mixture of zinc sulphide and molybdenum sulphide is in the form of nanoparticles in the range of 500 nm to less than 1 µm in size.

19. A process for the preparation of the composition according to claim 1, comprising the following steps:
a) precipitating a molybdenum precursor in the presence of a sulphur-containing compound and zinc sulphide in a solvent comprising a polyol at a temperature in the range of 150° C. to 250° C., to obtain a solution containing a composition comprising a mixture of a precipitate of zinc sulphide and a precipitate of molybdenum sulphide;
b) separating the composition obtained in step a) from the solution, then optionally washing said composition, and drying said composition; and
c) sulphurizing the composition obtained in step b) in the presence of a stream containing $H_2S$ and hydrogen.

20. A process for the production of hydrogen, in which a feed comprising water and/or hydrogen sulphide is brought into contact with a composition according to claim 1 in the presence of radiation emitting in at least one wavelength range above 280 nm, to produce an effluent containing hydrogen.

* * * * *